United States Patent [19]

Striegl

[11] 4,353,669
[45] Oct. 12, 1982

[54] DEVICE FOR MACHINE REAMER

[76] Inventor: Georg Striegl, Liststr. 29, 7472 Reutlinger, Fed. Rep. of Germany

[21] Appl. No.: 174,624

[22] Filed: Oct. 20, 1980

[51] Int. Cl.³ .................. B23B 27/16; B23B 29/02
[52] U.S. Cl. ............................ 408/185; 408/705; 408/713
[58] Field of Search ............... 408/59, 179, 180, 181, 408/185, 188, 197, 211, 233, 240, 705, 713; 407/107, 111

[56] References Cited

U.S. PATENT DOCUMENTS

| 2,310,992 | 2/1943 | Proksa | 407/111 X |
| 4,125,342 | 11/1978 | Kress | 408/179 |
| 4,163,624 | 8/1979 | Eckle | 408/185 |
| 4,239,425 | 12/1980 | Striegl | 408/181 |
| 4,288,184 | 9/1981 | Veigel | 408/185 |

Primary Examiner—Z. R. Bilinsky

[57] ABSTRACT

A reamer has a head with a recessed bearing plane which absorbs the pressure of a clamping member which presses against one side of a cutter knife. A counter member is positioned with one side displacable on the recessed bearing plane in the direction of increased cutting diameter. The cutter knife is held between the clamping member and the counter member. The counter member has a region with a straight holding portion which supports the cutter knife. The clamping member and counter member have congruent oblong holes which extend in the direction of increased cutting diameter. These holes are traversed by a clamping screw which is screwed into a threaded hole in the head. When the screw is tightened, the three piece unit of clamping member, cutter knife and counter member are tightened in the reamer head. A pair of set screws pass through holes in the head to move contact pieces against a thrust bar which extends from the straight holding portion of the counter member, and hence move the three piece unit in the direction of increased cutting diameter.

9 Claims, 9 Drawing Figures

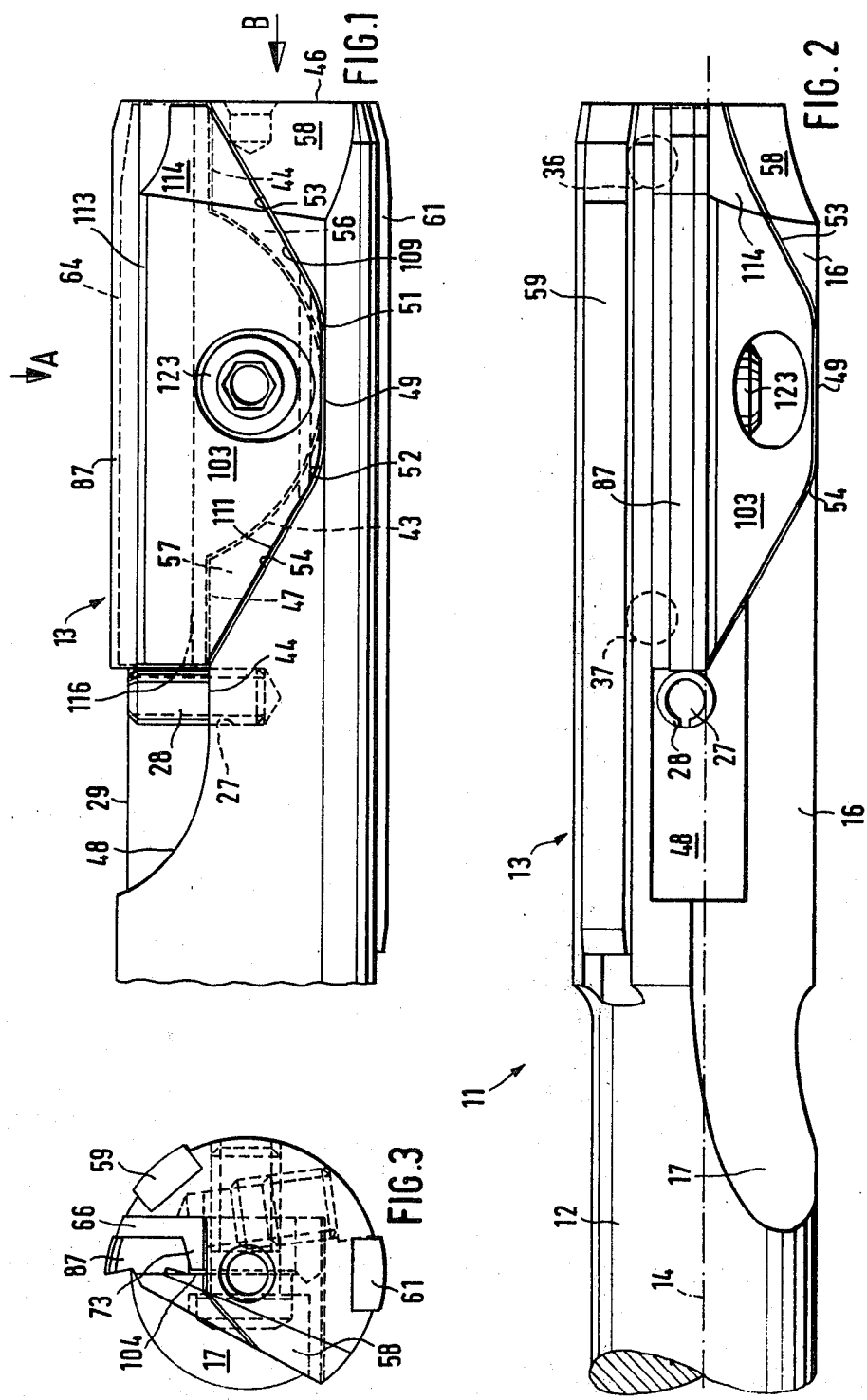

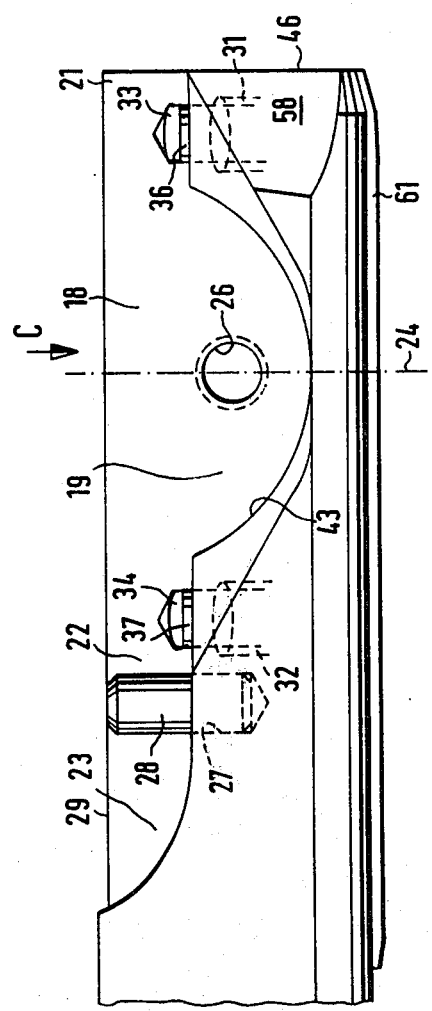
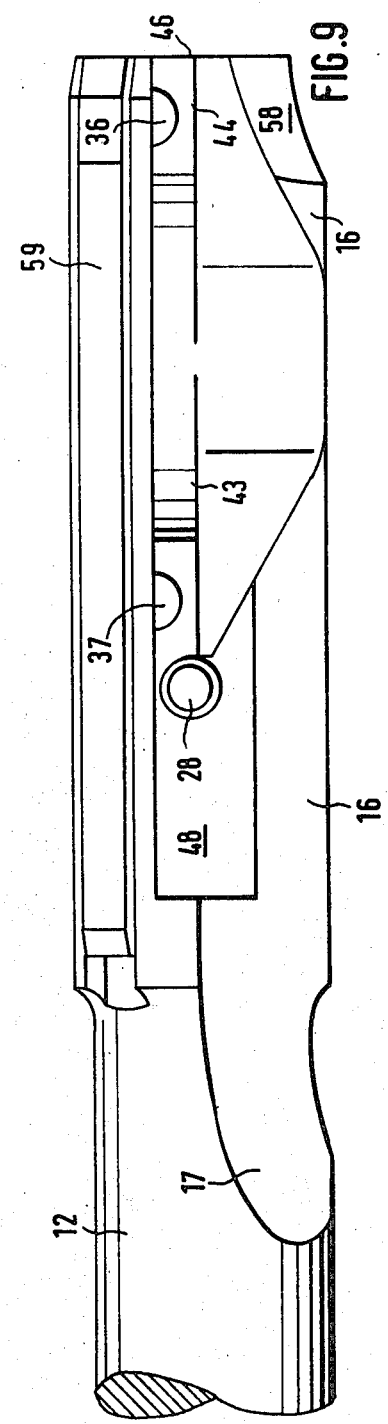

DEVICE FOR MACHINE REAMER

This invention relates to machine reamers and more particularly to machine reamers in which hard metal cutter knives can be adjusted in the reamer head between positions corresponding to smaller and larger cutting diameters.

BACKGROUND OF THE INVENTION

Devices of this type include a recessed bearing plane in the reamer head for absorbing the pressure of a clamping member against a cutter knife clamped between them, and a pair of set screws spaced apart in a pair of bore holes ending in said recessed bearing plane. These set screws are associated with the end regions of the cutter knife to move it in the direction of increased cutting diameter. Such devices also include a clamping screw which traverses a threaded hole in the reamer head and a hole in the clamping member or clamping shoe and, with its head seated in the clamping member, presses the clamping member against a first side of the hard metal cutter knife.

Devices of this kind have become known, for example, from the German Pat. No. 1,144,568, the U.S. Pat. No. 3,490,315 and particularly from the German Pat. No. 1,427,182, FIGS. 1–3.

The latter has practically dominated the market but has had the following shortcomings:

(a) Hard-metal knives have many properties in common with those of glass: they shatter easily and the fracture sites have very sharp edges. When such a hard-metal knife fractures, notches are formed at the bearing points in the head which represent roughnesses. As a result, the entire machine reamer made of expensive special steel has to be discarded.

(b) When the hard-metal knive is set for a smaller diameter, then the bearing surface of the hard-metal knife is larger and becomes smaller the larger the diameter. This, however, is undesirable since it is obvious that at larger diameters, larger forces are introduced into the hard-metal knife than at smaller diameters.

(c) When the hard-metal knife is set for a smaller diameter, then the clamping member is situated more in the direction of the center portion of the hard-metal knife than when the hard-metal knife is set for larger diameters. This means that the manner in which forces are introduced and absorbed is also affected from this side.

(d) The setscrews press via wedge-shaped pieces against the free surfaces of the inside edge of the hard-metal knife. This means the introduction of different forces into the hard-metal knife. In order to be at all able to absorb these forces, it must be relatively wide. However, at the high cost of hard-metal, this means a wasting of material. In addition, great care must be taken by accurate manufacture so that forces are not introduced directly at the cutting edges because the latter would then simply break away.

(e) The hard-metal knife must, therefore, withstand opposing forces: it must, on the one hand, be gripped with great force, but at the same time, it must still be amenable to a radial displacement.

(f) In order to keep the difference of the forces occurring at different radii from becoming excessive, only a small range of diameters can be covered with one machine reamer. It is, therefore, necessary to keep a relatively large number of machine reamer sizes in stock.

OBJECT AND STATEMENT OF THE INVENTION

The object of the invention is to avoid the aforementioned shortcomings at low cost and in a manner suitable for mass production, without sacrificing precision. According to the invention, this problem is solved by the following features:

A counter member or counter fixture is positioned with one side displacable on the recessed bearing plane in the head, in the direction of increased cutting diameter. The counter member has a clamping (holding) region with a straight holding portion for supporting a second side of the cutter knife and center region with an oblong hole traversed by the clamping screw, which extends longitudinally in the direction of increased cutting diameter. The seat and the hole in the clamping member for the clamping screw are oblong and the hole is congruent with the hole in the counter member. One cutting edge of the cutter knife projects beyond the counter member in its clamping region. Contoured locking means connect the clamping member and the counter member or fixture with effective locking surfaces that extend substantially perpendicular to the direction of increased cutting diameter.

Advantageously, the invention includes the following additional features:

The contoured locking means, seen from the straight holding portion in the clamping region, lies on the other side of the oblong hole and the contour locking means comprises a swivel joint having a geometrical longitudinal axis, around which the clamping member is tiltable toward the counter member by tightening of the clamping screw.

Through these characteristics it is possible, by combining the contoured locking means with the swivel point, to make do with a single component, which enhances the possibilities of miniaturization, the efficient manufacture and the simplicity of assembling.

The contoured locking means including the swivel joint comprises a compression-resistant longitudinal edge and a matching longitudinal slot permitting a tilting motion.

Through these characteristics, a particularly simple design of this component is obtained.

The contour clamping member has a thrust bar extending substantially perpendicular to the straight holding portion of the clamping region along its inner long side without a discontinuity.

Through this characteristic any relative motion of the straight portion and the thrust bar is avoided, which could, for example, happen when the thrust bar is provided at the clamping shoe (clamping member).

The thrust bar is lower than the level of the hard-metal knife, in the direction of increased cutting diameter.

Through this characteristic, assurance is provided that the edge is not subjected to any stresses.

The cutter knife has a clearance angle and the thrust bar has an inside wall with a bearing surface having an inclination roughly corresponding to the clearance angle of the cutter knife.

Through these characteristics, the thrust bar makes contact with the hard-metal knife over a large area.

The clamping screw head has a flat bearing surface that lies parallel to the recessed bearing plane in the head and a washer is underneath the flat bearing surface.

Through these characteristics, the tensile forces remain constant, which would not be the case if the bearing surface were to deviate from parallelity.

The washer has an internal bore which is substantially larger than the diameter of the clamping screw shank.

Through this characteristic, the washer can go along over a short distance during the outward movement of the clamping shoe (in the direction of the increased cutting diameter) so that advantage can be taken of the principle of least resistance.

Both the clamping member and the counter member have a bulge in the region of the oblong holes and become narrower toward their ends and the head has a corresponding recess therein.

Through these characteristics, all or at least part of a pressure drop in the regions farther removed from the clamping screw is avoided.

DESCRIPTION OF THE DRAWINGS

The invention will now be described with reference to a preferred embodiment. The figures shown on the drawing are:

FIG. 1—the top view of the head,

FIG. 2—a view along the arrow A in FIG. 1,

FIG. 3—a view along the arrow B in FIG. 1,

FIG. 8—a view similar to FIG. 1 but without counter fixture, clamping shoe, knife, and clamping screw, FIG. 9—a view along the arrow C in FIG. 8. All figures are on a scale of 5:1.

DETAILED DESCRIPTION OF THE EMBODIMENT

Figure 4:
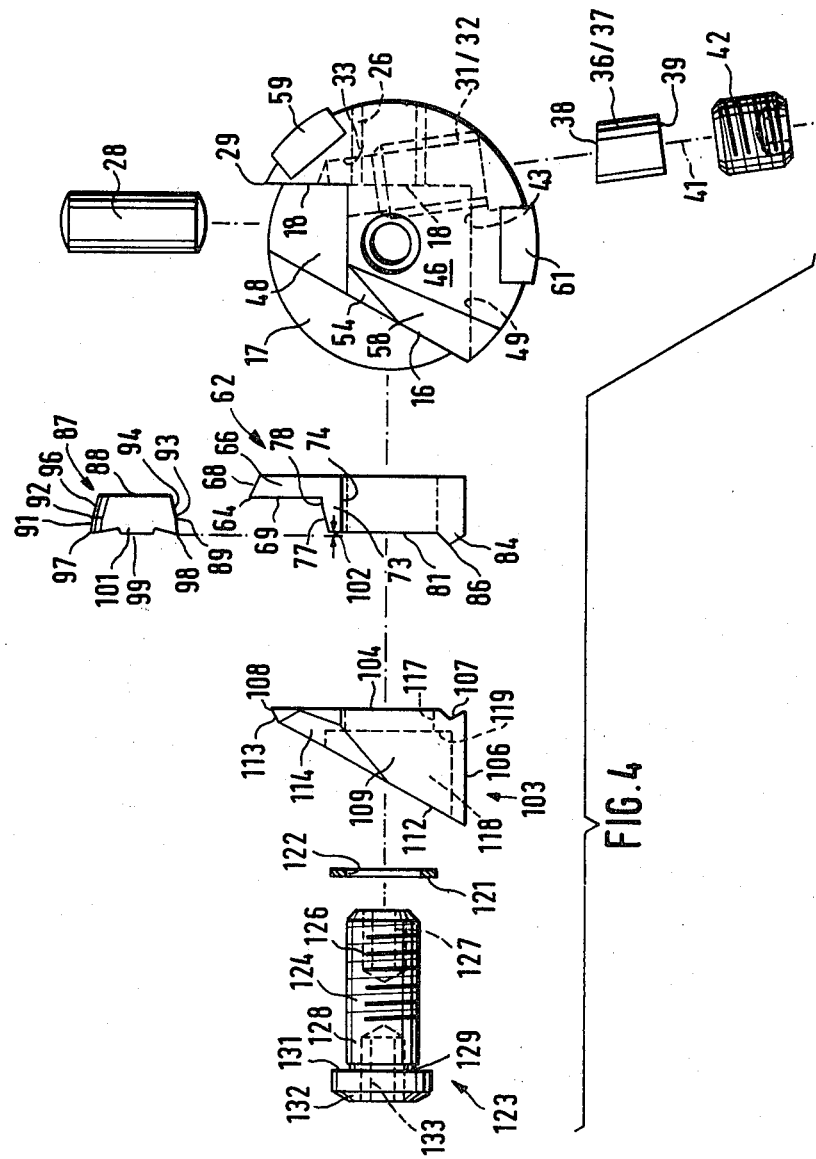
FIG. 4—a view similar to FIG. 3 but exploded.
Figure 5:
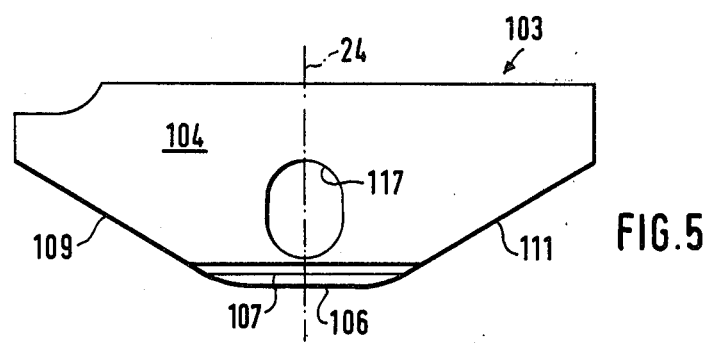
FIG. 5—the bottom view of the clamping shoe.

A machine reamer 11 shown merely in its head region has a shaft 12 ending in a head 13. For the creation of a chip space, an unobstructed plane 16 with a run-out 17 at the left is milled into the head 13 tangentially to the geometrical longitudinal axis 14 of the machine reamer 11.

From the free plane 16 toward the interior a bearing plane 18, whose shape is most apparent from FIG. 8, is worked into the head 13 at an angle of approximately 29 degrees. It is completely flat and comprises a central portion 19 in the shape of a circular sector which is joined on the right by a small lateral surface 21 approximately square in shape and on the left by a lateral surface 22 approximately rectangular in shape. The lateral surface 22 ends on the left in a projection 23 in the shape of a circular sector. In a center plane 24 there is vertically to the bearing plane 28 an internal thread 26 which goes all the way through. However, the internal thread 26 does not sit in mid-radius of the center portion 19 but is according to FIG. 8 shifted farther down. Parallel to the bearing plane 18, but at a small distance from it, a cylindrical stop pin 28 is set into a blind hole 27 in the left region of the lateral surface 22. In the view of FIGS. 1 and 8, it is flush with the forward edge 29 of the bearing plane 18. Symmetrically to the center plane 24 and at an angle of about 8°, two identical tapped holes 31, 32 ending in a blind hole 33 or 34, respectively, are worked into the head 13. This blind hole is driven to the extent that it extends a few millimeters into the lateral surfaces 21 and 22, respectively, where it forms a semicylindrical recess.

In each blind hole a thrust piece 36, 37 of cylindrical shape is situated which at its forward end has a slope of approximately 8° (like the blind hole 33, 34 with respect to the bearing plane 18) and which has on its backside a bearing surface 39 which is at right angles to the geometrical longitudinal axis 42. Each thrust piece 36, 37 can be pushed more or less into the semicylindrical recess by a posterior setscrew 41 with a hexagonal recess.

The backside of the center portion 19 is bounded by an edge 43 in the shape of a circular sector which stands vertically to the bearing plane 18 and turns on the right side into a straight edge 44 of the same height which likewise stands vertically on the bearing plane 18 and which on the right side debouches into the frontal area 46 of the head. The edge 44 cuts into the blind hole 33. At the same height and again vertically to the bearing plane 18 the edge 43 on the left turns into a straight edge 47 which cuts into the blind hole 34 and extends linearly beyond the stop pin 28 and then forms an arc 48 in accordance with the inside contour of the projection 23.

In the head 13 still another milled recess which is symmetrical to the center plane 24 is provided above the edges 43, 44, 47. Its posterior edge 49 is straight and stands vertically to the bearing plane 18. It extends on both sides of the center plane 24. Then follow on either side two small radii 51, 52 which turn into a right edge 53 and a left edge 54. The edges 53, 54 likewise stand vertically to the bearing plane 18. The right edge 53 debouches into the frontal area 46. The left edge 54 turns into the edge 47 and still farther to the left turns congruently (FIG. 1) into the arc 48. In the region of the center plane 24, the posterior edge 49 turns according to FIGS. 1 and 8 into the edge 43. However, since the posterior edge 49 runs linearly and vertically to the center plane 24 and since it then turns into the left edge 53 and the right edge 54, a right step upper side 56 and a left step upper side 57 is formed; with regard to the swept triangular shape specific reference is made to the figures.

In order to provide a better runoff for the starting chip, a bevel is worked in starting from the right of the free surface 16 and ending in the frontal area 46.

In addition, two hard-metal support bars 59, 61 are worked into the head 13. According to FIGS. 3 and 4, the drilling for the tapped hole 31, 32 starts shortly below the support bar 61. The blind holes 33, 34 do not extend all the way to the hard-metal support bar 59.

Figure 6:
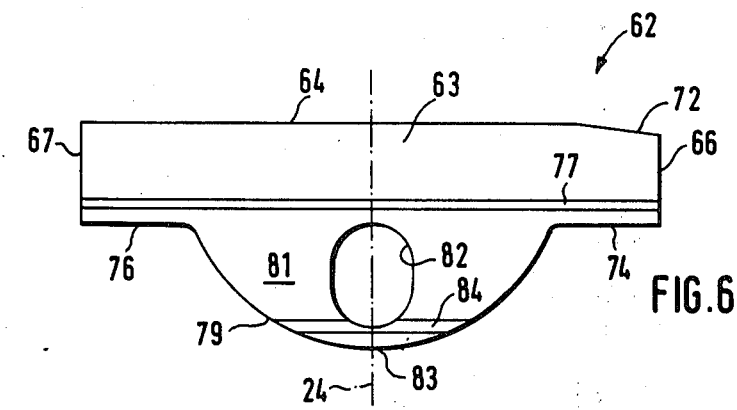
FIG. 6—the top view of the counter clamping member (counter fixture)
Figure 7:
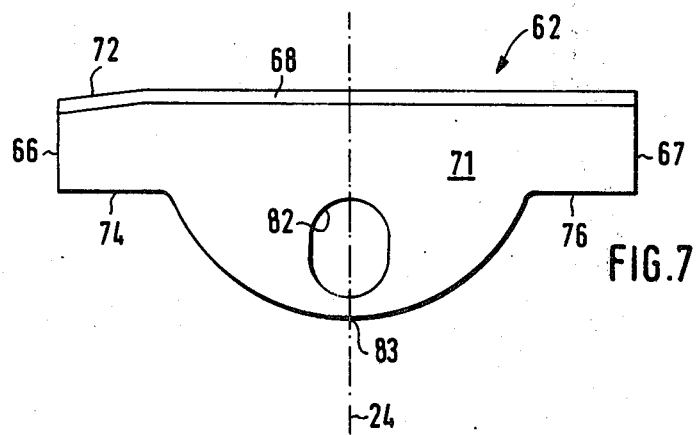
FIG. 7—the bottom view of the counter fixture (counter clamping member)

A counter fixture 62 is made of 42 Cr Mo$_4$ and has a holding bar 63 with an I-cross section. It has a forward straight edge which with the bearing surfaces 74, 76 protruding the same distance stands vertically to the center plane 24. The lateral edges 66, 67 run parallel to the center plane 24. According to FIG. 4, a bevel 68 projecting toward the rear is provided. The upper side 69 is completely flat and runs parallel to the equally flat counter fixture 62. Because of the still to be discussed knife shape, the holding bar has at its upper right corner, according to FIG. 6, a bevel 72.

At the rear, the holding bar 63 turns into a thrust bar 73 which likewise extends vertically to the center plane 24, shows in the two wing regions bearing surfaces 74, 76 standing vertically to the underside 71 and has in front a contact bevel 77 corresponding to the shape of the still to be discussed hard-metal knife. The contact bevel 77 in itself is flat but does not extend as far as the upper side 69 so that a stepped face 78 remains standing vertically to the upper side 69. On its backside between the two bearing surfaces 74, 76 the thrust bar 73 turns into a bulge 79 which has the shape of a circular sector, is based on the underside 71 and whose upper side 81 turns flush into the upper side of the thrust bar 73. In the bulge 79, an oblong through-hole 82 whose longer axis lies in the center plane 24 is worked in symmetrically to the center plane 24. As is best seen in FIG. 4, the oblong hole does, on the one hand, not extend into the thrust bar 73 nor does it, on the other, extend as far as the apex region 83 of the bulge. Between the oblong hole 82 and the apex region 83 a transverse edge 84 is provided at the upper side 81, with said edge standing vertically to the center plane 24 and possessing a longitudinal ridge 86 running in the same direction. The longitudinal ridge 86 is situated slightly higher than the upper side 81. As shown particularly in FIGS. 1 and 2, the counter fixture 62 fits—however, with a certain amount of play—into the complementary recesses of the head 13, with the upper side 81 being situated higher than the right and left step upper sides 56, 57.

A hard-metal reversible cutting bit 87 has a flat bottom 88 which fits on the upper side 69. The reversible cutting bit 87 has on either side a backing-off clearance 89, 91 which does, however, have a bend 92, 93 so that the rectangular region 94, 96 lying below the bend 92, 93 corresponds in its slope to the bearing bevel 77. At the top, the reversible bit 87 has two cutting edges 97, 98 at whose level is also located the upper side 99 of a thrust bar 101. The latter has in this case an insular character because the cutting edges 87, 89 are provided with chip slots. These chip slots may, however, also be absent. As shown particularly clearly in FIG. 4, the upper side 99 together with the cutting edges 97, 98 in the inserted state projects by a distance 102 above the surface 81.

A clamping shoe 103 is roughly shaped like the slice of an apple. It is made of 42 Cr Mo4. Its underside 104 is flat but has in the region of its apex 106 a V-slot 107 extending at right angles to the center plane 24 which has a larger angle of opening than corresponds to the transverse edge 84. The clamping shoe 103, guided by the longitudinal ridge 86, can therefore tilt at least so far that the forward edge 108 rests on the upper side of the reversible bit 87. The clamping shoe has inclined surfaces 109, 111 extending from the region of the apex 106.

Symmetrically to the center plane 24 and beginning right next to the V-slot 107, an oblong hole 117 is provided which is congruent with the oblong through-hole 82. Toward the outside, the oblong hole turns into a head bore 118 also of oblong shape so that an annular seat 119 is formed.

On the seat 119 lies a washer 121 which has an internal bore 122. A clamping screw 123 has a shank 124 whose outer portion carries a thread 126 and in whose front end a polyhedron 127 has been recessed. The upper part of the shank is a circular cylinder 128 of the same diameter but without a thread. Through a recess 129 it is set off from the bearing surface 131 of a head 132. A polyhedron 133 has been recessed into the head 132. With the thread 126, the clamping screw 123 is screwed into the internal thread 26 in which case the shank 124 traverses the oblong through-hole 82 and the oblong hole 117.

During use, the reversible bit 87 is brought between the counter fixture 62 and the clamping shoe 103. This triple unit is then pushed in the head as far inward as possible such as is shown in FIG. 1. Then, the clamping screw 123 is tightened so that it exerts the final tension. Now, the setscrews 42 are screwed inward until the cutting edge 97 has the right position. In so doing, the triple assembly counter fixture reversible bit/clamping shoe is pushed outward in the correct manner—not necessarily parallel. This does not affect the clamping geometry of the reversible bit 87.

The pressure surfaces 38, 39 are situated quite far outside. It is, nevertheless, possible to use a very narrow reversible bit 87 since the latter does not have to withstand any bending forces. Since no harmful forces are superimposed on the reversible bit 87, no such harmful forces can be released during its use. Therefore, in spite of a saving of material, holes of perfect roundness are obtained.

As stated initially, the drawings are representations on a scale of 5:1. This means that the diameter cutting edge 97/bearing surface support bar 61 is equal to 1 cm. The other parts are correspondingly small. Even so, the head 13 has enough give but is, nevertheless, sufficiently rigid since the forces set up during the positioning need not be considered in the design of the reversible bits, which otherwise leads to very wide reversible bits which would, of course, require recesses cutting deeply into the head and thus weakening the head.

I claim:
1. In a machine reamer having:
   a head,
   a hard metal cutter knife having two cutting edges, first and second sides between said cutting edges, and a pair of end regions, and
   means for adjusting said hard metal cutter knife between first and second positions corresponding to smaller and larger cutting diameters; said means including
   a clamping member resting against said first side of said cutter knife and having a bore therein for a shank and a seat,
   a recessed bearing plane in said head for absorbing the pressure of said clamping member,
   said head having a tapped hole traversing said head and ending in said bearing plane, and a pair of bore holes spaced apart and ending in said bearing plane,
   a pair of set screws in said pair of bore holes associated with the end regions of said cutter knife for moving said cutter knife in the direction of increased cutting diameter,
   and a clamping screw having a shank which traverses said clamping member bore and is screwed into said tapped hole and a head seated in said seat of said clamping member; the improvement comprising:
   a counter clamping member separate from said cutter knife having one side displaceable on said recessed bearing plane in the direction of increased cutting diameter, a straight holding portion with a holding region for supporting said second side of said cutter knife, and a center region with an oblong hole traversed by said shank of said clamping screw which extends longitudinally in the direction of increased cutting diameter,
   said hole in said clamping member for said clamping screw being oblong and congruent with said oblong hole in said counter clamping member and said seat in said clamping member for said clamping screw head being an oblong seat, one of said cutting edges of said cutter knife projecting beyond said holding region of said counter clamping member, in the direction of increased cutting diameter, and contoured locking means connecting said clamping member with said counter clamping member, said contoured locking means having effective locking surfaces that extend substantially perpendicular to the direction of increased cutting diameter.

2. Improvement according to claim 1, wherein said contoured locking means, seen from said holding region of said straight holding portion, lies on the other side of said oblong hole and said contoured locking means comprises a swivel joint having a geometrical longitudinal axis, around which said clamping member is tiltable toward said counter clamping member by tightening of the clamping screw.

3. Improvement according to claim 2, wherein said contoured locking means including said swivel joint comprises a compression-resistant longitudinal edge and a matching longitudinal slot permitting a tilting motion.

4. Improvement according to claim 1, wherein said counter clamping member has a thrust bar extending substantially perpendicular to said straight holding portion along its inner long side without a discontinuity.

5. Improvement according to claim 4, wherein said thrust bar is below the surface of the hard-metal knife leading to the innermost cutting edge, in the direction of increased cutting diameter.

6. Improvement according to claim 4 or 5, wherein said cutter knife has a clearance angle and said thrust bar has an inside wall with a bearing surface having an inclination roughly corresponding to the clearance angle of said cutter knife.

7. Improvement according to claim 1, wherein said clamping screw head has a flat bearing surface that lies parallel to said recessed bearing plane in said head and said improvement comprises a washer underneath said flat bearing surface.

8. Improvement according to claim 7, wherein said washer has an internal bore which is substantially larger than the diameter of said clamping screw shank.

9. Improvement according to claim 1, wherein both said clamping member and said counter clamping member have a bulge in the region of said oblong holes and become narrower toward their ends and said head has a corresponding recess therein.

* * * * *